United States Patent [19]
Hoffman

[11] Patent Number: 5,846,464
[45] Date of Patent: Dec. 8, 1998

[54] METHOD FOR FORMING COMPOSITE PARTS USING RECONFIGURABLE MODULAR TOOLING

[75] Inventor: Peter L. Hoffman, Florissant, Mo.

[73] Assignee: McDonnell Douglas Corporation, St. Louis, Mo.

[21] Appl. No.: 826,022

[22] Filed: Mar. 28, 1997

[51] Int. Cl.[6] .............................. B29C 33/40; B28B 7/02
[52] U.S. Cl. .................. 264/219; 264/40.1; 249/155; 425/182; 425/DIG. 30; 425/DIG. 44
[58] Field of Search ................................ 264/219, 40.1, 264/40.5; 249/155; 425/175, 394, 182, 395, 406, 408, DIG. 44, DIG. 30

[56] References Cited

U.S. PATENT DOCUMENTS

| | | | |
|---|---|---|---|
| 4,088,312 | 5/1978 | Frosch et al. | 269/21 |
| 4,200,272 | 4/1980 | Godding | 269/26 |
| 4,684,113 | 8/1987 | Douglas et al. | 269/21 |
| 4,956,924 | 9/1990 | Hu | 33/561.1 |
| 5,168,635 | 12/1992 | Hoffman | 33/561.1 |
| 5,330,343 | 7/1994 | Berteau | 425/175 |
| 5,513,972 | 5/1996 | Schroeder et al. | 425/175 |

*Primary Examiner*—Jan H. Silbaugh
*Assistant Examiner*—Suzanne E. Mason
*Attorney, Agent, or Firm*—Peoples, L.L.C.; Veo Peoples, Jr.; Ben Hudson

[57] ABSTRACT

A method of forming composite parts that consist of the steps of generating a part design in a computer graphics system, positioning an array of rubber blocks having an array of apertures with slidable pins therein and locking the rubber blocks together on a servo drive mechanism forming a tooling fixture. The array of pins has a flexible face sheet connected to them such that the array of pins is adjusted to form the face sheet to approximate the contour of the composited part to be manufactured. The tooling module is then removed from the base servo drive mechanism and used as a mold in an autoclave for cutting composite materials.

2 Claims, 3 Drawing Sheets

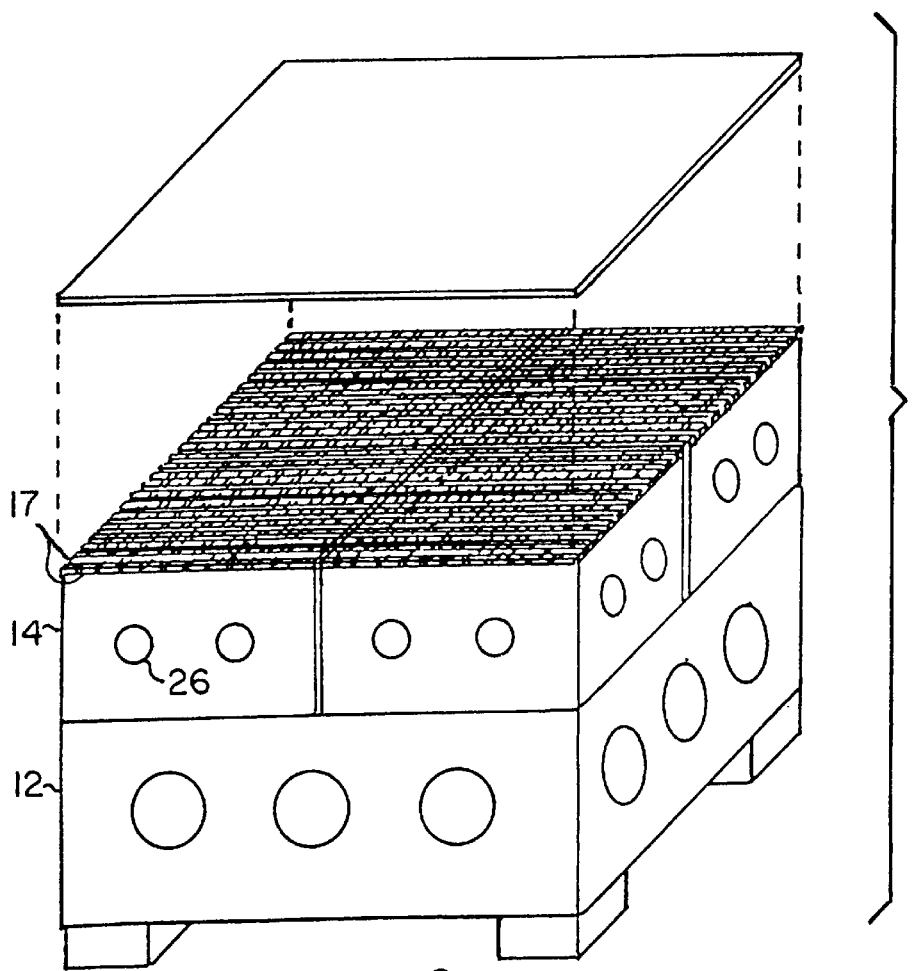
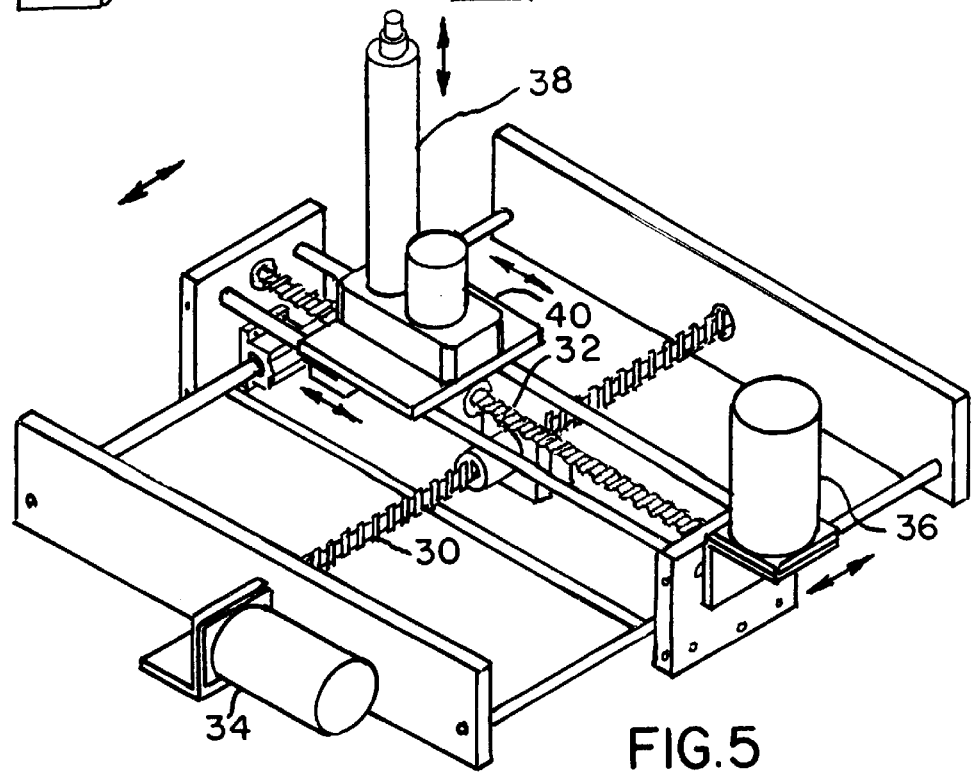

METHOD FOR FORMING COMPOSITE PARTS USING RECONFIGURABLE MODULAR TOOLING

BACKGROUND OF INVENTION

1. Field of Invention

This invention relates generally to tooling for positioning and forming workpieces, and, more particularly, tooling that can form a workpiece into a particular shape and then be reconfigured to adapt to a workpiece of a different shape, providing tooling which can be reconfigured for infinite numbers of shapes.

2. Brief Description of Prior Art

It is well known to those skilled in the art to provide apparatus that is disposed to automatically conform to the contour of a curved surface or workpiece. These apparatuses use spaced arrays of adjustable rods or spindles mounted in a two-dimensional array that can be moved upwards individually and locked in position to approximate the contour of a workpiece. Such apparatuses are shown in U.S. Pat. No. 4,200,272, entitled "Holder for Irregular Shaped Articles", U.S. Pat. No. 4,088,312, entitled "Variable Contour Securing System", and U.S. Pat. No. 4,684,113, entitled "Universal Holding Fixture". These patents disclose apparatuses that all have certain common features, the first being that the fixtures generally comprise an array of engaging rods which are individually adjusted in height so that they approximate the contour of a workpiece. These rods which engage the workpiece are locked in place by some type of locking mechanisms, and a holding force, usually a suction cup, is used to firmly engage the workpiece to the fixture.

The apparatuses disclosed in these patents are generally designed to support and hold a workpiece in a fixed position to provide for further machining or manufacturing.

Disclosed in U.S. Pat. No. 5,168,635, entitled "Conformable Tool", assigned to the assignee of the instant application, is an apparatus having an array of pins that are locked in place to conform to a workpiece contour so that the tool can be used as a forming base to reproduce the workpiece surface. This apparatus is distinguished from the patents previously cited because it is designed to form a mold or base for reproducing a workpiece surface as opposed to locking a workpiece in position for further manufacturing. It would be desirable if there were provided tooling that can be reconfigured to form molds for a variety of parts as defined by a computer aided drawing of the component.

OBJECTS OF THE INVENTION

It is an object of this invention to provide an improved apparatus and method for approximating a workpiece contour.

It is a further object of this invention to provide an improved apparatus and method for a conformable tool that can approximate an infinite number of workpiece contours forming a base or mold for producing a workpiece having a surface matching the contour of the mold.

It is still a further object of this invention to provide an apparatus and method for a conformable tool that is generally comprised of modular building blocks that can be added or removed from the apparatus so that the tool can conform to workpieces having different sizes as well as shapes.

SUMMARY OF THE INVENTION

There is provided by this invention a reconfigurable tooling module and method for the use thereof that has a base drive unit disposed to provide motions along three independent and orthogonal axis: x, y, and z. Mounted on the base unit are modular tooling blocks that are locked together to form a single tooling unit, each having apertures for supporting an array of pins that are individually adjusted by the drive unit to approximate the shapes of various workpieces. Each tooling module is generally comprised of an elastomeric block having an array of hexagonal apertures cut therein. Each aperture has an hexagonal-shaped pin disposed to be slidably mounted within the module. The module is mounted upon the drive base unit such that the drive base unit can adjust the height of each pin individually and rotate the pin, which distorts the shape of the aperture and locks the pin in position. A flexible surface is connected to the ends of the pin that forms the contour of a workpiece mold. Once the flexible surface is formed into a mold by the array of pins, the tooling modules are removed from the base and may be utilized to form composite parts.

BRIEF DESCRIPTION OF THE DRAWINGS

FIG. 4 illustrates a tooling rack supporting individual tooling modules.

FIG. 5 is an isometric view of the drive unit.

BRIEF DESCRIPTION OF THE PREFERRED EMBODIMENT

Figure 1:
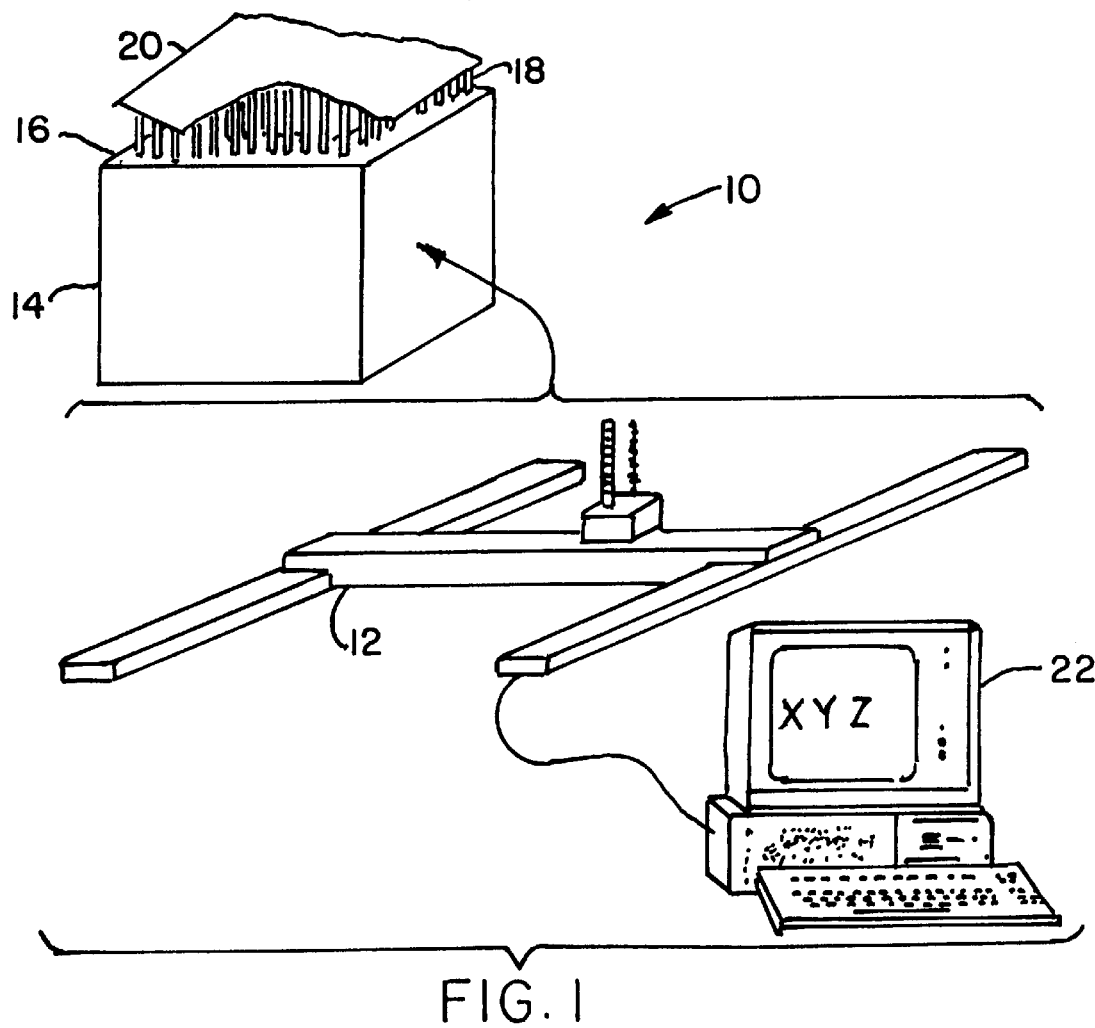
FIG. 1 illustrates a modular reconfigurable tooling system incorporating the principles of this invention.

Referring to FIG. 1, there is shown a modular reconfigurable tooling system 10 incorporating the principles of this invention. The system is comprised of a base drive servo-mechanism 12 that provides independent motions along the x, y and z directions. Mounted upon the base drive servo unit 12 is a modular tooling unit 14 which is generally a block of elastomeric materials having an array of hexagonal apertures cut therein. The apertures 16 are approximately 1-inch apart from each other in the array. Slidably mounted in each aperture is a hexagonal pin 18. The modular tooling unit 14 is approximately 1-foot by 1-foot (1'×1') in size. Although only one modular unit is shown, an array of modular units may be connected together to form the complete system. For instance, a 4'×4' system may consist of four of the 1'×1' modular tooling units. This modular design allows the system to be reconfigured to adapt to the size of the workpiece. The hexagonal pins 18 are moved vertically by the base drive unit 12 to positions that match the contour of a predefined CAD shape. The flexible facesheet (20) may be a rubber sheet or other flexible material. Each of the pins is moved vertically to a height that matches the contour of the predefined CAD shape and locked in position in a manner hereinafter described. The drive unit 12 is controlled by a PC or other computer means 22 through an interface, not shown but well known to those skilled in the art, which has stored therein software and other algorithms that can approximate the shape and contour of various work surfaces. Attached to the ends of the hexagonal pins are flexible supports 24 which are subsequently attached to the flexible facesheet (20) and hold it in position.

Figure 2:
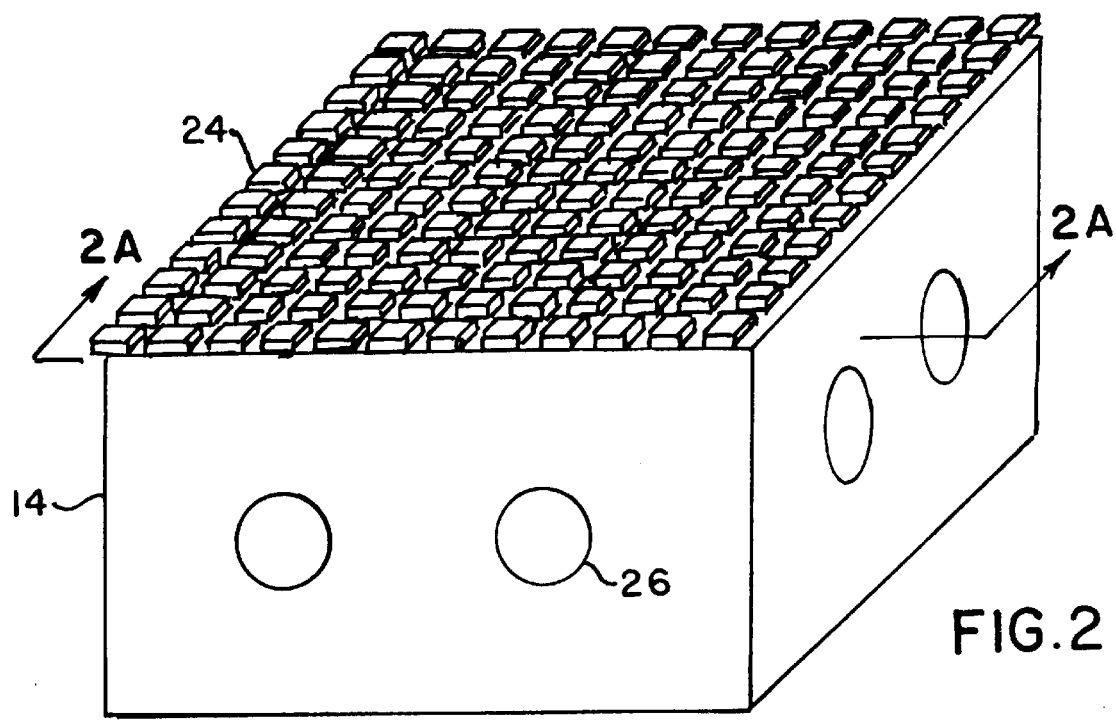
FIG. 2 is a perspective view of a reconfigurable tooling module.
Figure 2A:
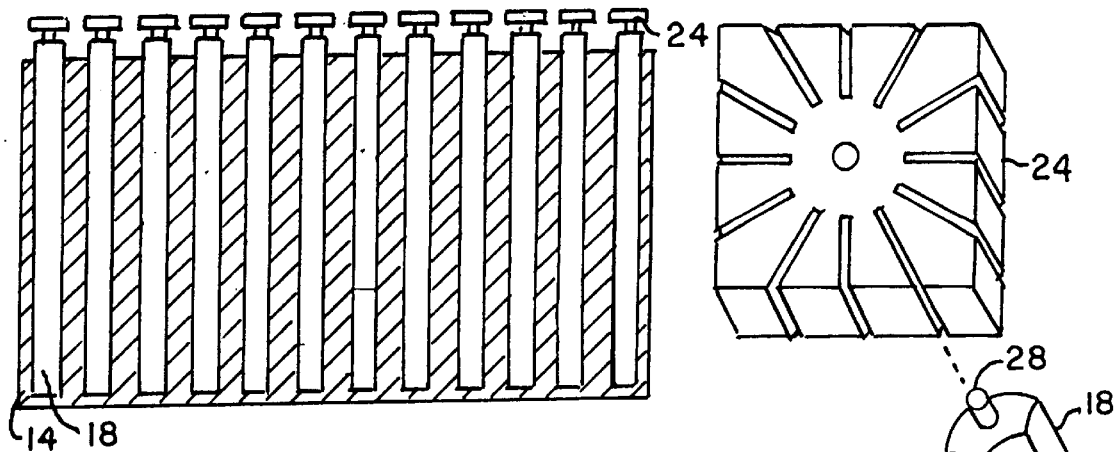
FIG. 2A is a side view of the reconfigurable tooling module shown in FIG. 2.
Figure 2B:
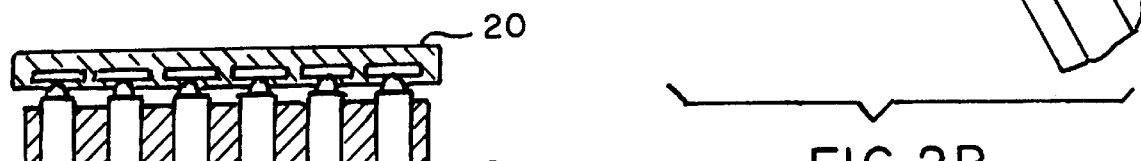
FIG. 2B is a top view of a slidable pin shown in FIG. 2.

FIG. 2 is a perspective view of a reconfigurable tooling module 14. Connect points, such as 26, are provided so that modules may be connected to or aligned to each other. Atop each pin 18 is a flexible tooling support 24 by which a flexible coupling is made with the flexible facesheet 20. FIG. 2A is a sectional view taken along the line 2A—2A of FIG. 2 which shows the pin mounted in the reconfigurable tooling module having the flexible tooling support 24 mounted thereon. A pin and ball bearing 28 supports the flexible tooling support 24 so it can pivot universally. Flexible tooling surfaces 24 are generally comprised of a spring support head as shown in FIG. 2B that gives the head near constant stiffness across its surface. The head is encased in rubber for flexibility.

Figure 3A:
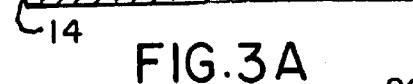
FIG. 3A is a side view of the reconfigurable tooling module shown in FIG. 2 in its initial position.
Figure 3B:
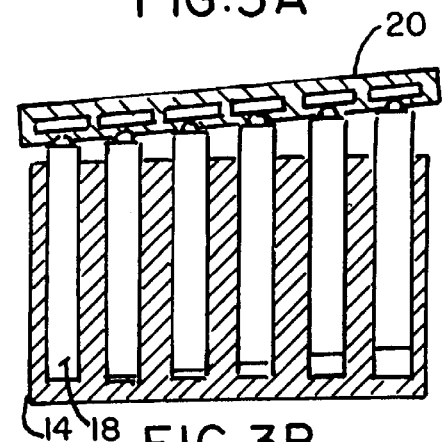
FIG. 3B is a side view of the reconfigurable tooling module shown in FIG. 2 in a contoured position.

As shown in FIGS. 3a and 3b, as the different pins are moved into positions at different heights as defined by the digital surface definition from the computer station 22, flexible heads change position and shape to conform to the position of the surface generated by the computer 22. In FIG. 3A the pins 18 are in their initial position prior to actuation of the base drive servomechanism 12. Upon starting the generation of the surface contour, the pins 18 are each moved by the drive unit vertically to a position corresponding to the surface contour at that point.

FIG. 4 illustrates an array of tooling modules mounted on a drive base unit 12 supporting a one-piece RTV rubber face sheet that serves as the flexible workpiece mold 20 that provides a smooth tooling surface. Four tooling modules 14 are mounted on the drive unit 12 to form a 2'×2' tooling surface. The rows and columns of apertures supporting the pins 18 are separated by metallic strips such as 17 that serve to isolate each aperture independently.

FIG. 5 generally shows the base unit having a drive assembly incorporated therein. The base unit is designed to provide motions along the orthogonal axes x, y, and z. The motion of the device along the x and y axes is accomplished by two ball screw arrangements 30 and 32 driven by two powerful high performance stepper motors 34 and 36. Each stepper motor has an integrated encoder used for accurate positioning and servoing the motor. The third independent axis includes a linear actuator 38 powered by a stepper motor 40. The linear actuator 38 is able to provide up to 500 lbs. of force. This linear actuator provides a pure translational motion without any rotational motion along the z-axis. The linear actuator is equipped with a high resolution potentiometer providing analog signals and positive feedback to the computer 22. Each pin 18 has a maximum of 3 inches travel along the z-axis. Besides providing the three independent motions along the x, y, and z directions, the basic driving unit provides a 30° rotation about its z-axis of translation, reaches each pin individually and is capable of locking and unlocking by rotating it plus or minus 30° to its current position. The locking function is accomplished because the modular tooling units are comprised of a hard rubber; when the hexagonal pins are positioned in the hexagonal apertures, the shafts easily and slideably move within the apertures, but upon rotation of the pin within the aperture, the pin configuration is out of alignment with the configuration of the aperture which distorts the aperture and forces the pin in a natural locking position. The metallic strips 17 prevent the distortion of any one aperture from affecting another.

Figure 6:
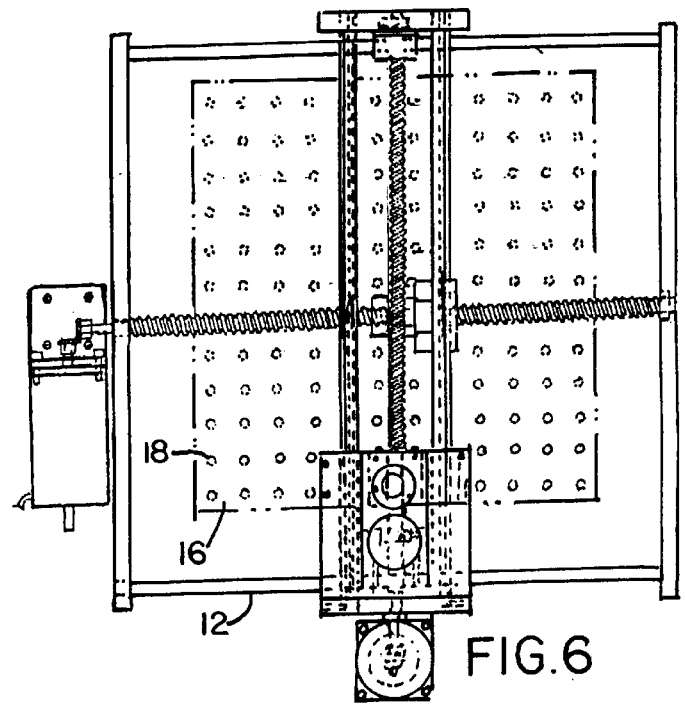
FIG. 6 is a plan view of the reconfigurable tooling apparatus.

FIG. 6 shows a plan view of the modular tooling assembly, illustrating the drive unit 12 and the apertures 16 and pins 18. The drive unit moves to each pin and adjusts its height based upon the digital generated by the computer 22. Referring again to FIGS. 1 through 4, in the case where the computer generates the contour of a workpiece to be manufactured, the drive unit individually moves the pins to adjust the contour of the flexible facesheet 20 to conform to the design generated by the computer forming a mold for fabrication of a part conforming to the contour of the flexible facesheet 20. In this case the flexible facesheet 20 is now ready and adaptable to be used as a forming device for producing a composite part such as that used in the aircraft or automotive industries. Once the flexible facesheet has been formed by the sequence described in 1–4 above, the tooling modules 14 can be removed from the drive base 12. The tooling modules then are sent to other manufacturing areas or process areas where the tooling modules are actually used as a mold for forming and curing parts and other apparatuses, such as composite parts for aircraft. In this instance, new modules may be placed on the drive unit 12 and the process is initiated again for a workpiece having a different size and contour while the previous modules are going through further processing and manufacturing. Thus, the tooling modules 14 are tooling fixtures that can be placed in autoclaves or other molding equipment in which composite parts or other parts may be manufactured without subjecting the electronics and the drive units 12 to the process environments during further manufacturing.

In using this equipment to generate composite parts such as those used in the aircraft industry and the automotive industry, the modular tooling system as described may be used as follows. First, the operator would generate a surface design using a CAD package which may be supplemented with a database containing a 2-D or 3-D graphics library used for regeneration of curved surfaces. Logical checking is performed by the system software to assure that the modular reconfigurable tooling system has the ability to meet the geometry requirements of the surface design. The computer then instructs the drive unit 12 to adjust the pins 18 to individual heights to approximate the contour of the surface design generated by the computer. On-line feedback systems may be provided (not shown, but well known to those skilled in the art) that feeds back to the computer the actual positioning of each pins 18 so that the curvature of the surface to be generated is closely approximated. Once the tooling modules have been reconfigured by the drive unit 12 to form a mold for generating a part, the tooling modules may be removed from the control unit base 12 for further processing. Once separate from the base and the systems electronics the tooling module now is configured into a mold for forming and curing a composite part.

Although there has been illustrated specific structure and mode of operation, it is clearly understood that the same were merely for purposes of illustration and that changes and modifications may be readily made by those skilled in the art without departing from the spirit and scope of this invention.

What is claimed:

1. A method for molding composite parts consisting essentially of:
   a. generating a part design in a computer graphics system;
   b. positioning on a servodrive mechanism base, an array of two or more rubber blocks having apertures which support an array of pins slideably mounted therein, which pins have flexible tooling supports mounted thereon; and
   c. locking the rubber blocks together on the servodrive mechanism base to form tooling modules;

d. connecting a flexible facesheet over the flexible tooling supports of the array of pins and postioning the array of pins by action of the servodrive mechanism base, which is controlled by the part design generated in the computer graphics system, in order to approximate with the flexible facesheet the contour of a composite part to be manufactured;

e. locking the array of pins, of the tooling modules, with the flexible surface connected thereto in the defined contour to form a mold for the composite part so defined;

f. removing the tooling module from the servodrive mechanism base; and g. using the tooling module as a mold in an autoclave for curing composite materials into a composite part.

2. A method for forming composite parts as recited in claim 1 wherein the step of positioning an array of pins consists of rotating the pins in the apertures of the rubber blocks causing the pins to be locked in position in said apertures of the rubber.

* * * * *